US012259493B2

(12) United States Patent
Hellweg et al.

(10) Patent No.: US 12,259,493 B2
(45) Date of Patent: Mar. 25, 2025

(54) METHOD AND RADAR TARGET SIMULATOR FOR GENERATING A SIMULATED RADAR ECHO SIGNAL

(71) Applicant: dSPACE GmbH, Paderborn (DE)

(72) Inventors: Bastian Hellweg, Esslingen (DE); Chris Hoffmann, Zwiesel (DE); Tim Fisch, Borchen (DE)

(73) Assignee: dSPACE GMBH, Paderborn (DE)

( * ) Notice: Subject to any disclaimer, the term of this patent is extended or adjusted under 35 U.S.C. 154(b) by 312 days.

(21) Appl. No.: 17/990,274

(22) Filed: Nov. 18, 2022

(65) Prior Publication Data
US 2023/0168342 A1  Jun. 1, 2023

(30) Foreign Application Priority Data
Nov. 29, 2021  (DE) .................... 10 2021 131 263.9

(51) Int. Cl.
*G01S 7/40* (2006.01)
(52) U.S. Cl.
CPC .................................. *G01S 7/4082* (2021.05)
(58) Field of Classification Search
CPC .... G01S 7/4052; G01S 7/4082; G01S 7/4086; G01S 7/4095
See application file for complete search history.

(56) References Cited

U.S. PATENT DOCUMENTS

| | | | | |
|---|---|---|---|---|
| 5,047,782 A | * | 9/1991 | Lew ...................... | G01S 7/4052 342/172 |
| 2012/0319884 A1 | | 12/2012 | Boltenbeck et al. | |
| 2021/0025742 A1 | | 1/2021 | Toda et al. | |
| 2021/0293924 A1 | * | 9/2021 | Chritton ................ | G01S 7/4021 |
| 2022/0082658 A1 | | 3/2022 | Paul et al. | |
| 2022/0107389 A1 | * | 4/2022 | Birkenhauer ............ | G01S 7/40 |
| 2022/0179043 A1 | * | 6/2022 | Vook ........................ | G01S 7/40 |
| 2022/0179044 A1 | * | 6/2022 | Vook ..................... | G01S 7/4069 |

FOREIGN PATENT DOCUMENTS

| | | |
|---|---|---|
| CN | 112558499 A | 3/2021 |
| DE | 199 48 898 B4 | 1/2006 |
| DE | 10 2011 007 745 B3 | 12/2012 |
| DE | 10 2015 121 297 A1 | 3/2017 |
| DE | 10 2019 111 300 A1 | 11/2020 |
| WO | WO 2020/141151 A1 | 7/2020 |

\* cited by examiner

*Primary Examiner* — Timothy X Pham

(74) *Attorney, Agent, or Firm* — Muncy, Geissler, Olds & Lowe, P.C.

(57) ABSTRACT

A method and a radar target simulator for generating a simulated radar echo signal. A radar signal is sent with known bandwidth from a radar sensor to be tested. The radar signal is received in the radar target simulator. The radar signal is filtered via a low-pass filter with known filter curve. The frequency spectrum of the filtered radar signal over the full bandwidth of the low-pass filter is determined. A corrected frequency spectrum and the power of a radar signal corresponding to the corrected frequency spectrum are calculated. A scaled radar signal from the filtered radar signal and the radar echo signal as a reflection of the scaled radar signal are calculated. The radar echo signal is sent from a transmitting antenna of the radar target simulator to the radar sensor to be tested.

8 Claims, 2 Drawing Sheets

METHOD AND RADAR TARGET SIMULATOR FOR GENERATING A SIMULATED RADAR ECHO SIGNAL

This nonprovisional application claims priority under 35 U.S.C. § 119(a) to German Patent Application No. 10 2021 131 263.9, which was filed in Germany on Nov. 29, 2021, and which is herein incorporated by reference.

BACKGROUND OF THE INVENTION

Field of the Invention

The present invention relates to a method for generating a simulated radar echo signal by sending a radar signal from a radar sensor to be tested to a receiving antenna of a radar target simulator, receiving the radar signal in the radar target simulator, filtering the radar signal in the radar target simulator using a low-pass filter and sending a simulated radar echo signal from a transmitting antenna of the radar target simulator to the radar sensor to be tested. Furthermore, the invention relates to a radar target simulator for generating a simulated radar echo signal.

Description of the Background Art

For the precise detection of the driving scenario, automated cars require high-resolution radar sensors that, aside from providing detailed images, also provide a wide field of view as well as altitude, distance, and speed information. Radar target simulators are used for the tests of these sensors, i.e., test benches that detect a radar signal of a vehicle radar system mounted as a DUT, calculate a radar echo of the signal on the basis of a real-time model and generate a delayed response signal corresponding to the calculated echo and radiate it to the DUT. In this way, the detection of a physical target is simulated for the DUT. The radar signal of the DUT passes through a low-pass filter during measurement by the target simulator, which serves as an anti-aliasing filter. Such signal filters reduce the bandwidth of the measurement because they only allow a signal to pass unattenuated on a limited spectrum. In a transition area adjacent to the limits of the filter spectrum, it attenuates the signal strength.

However, such a low-pass filter is necessary to avoid or reduce alias effects that occur in signal processing when digitizing analog signals: The original signal is sampled at regular intervals and restored during later playback by means of an analog low-pass filter.

In order for it to be restored correctly, according to the Nyquist-Shannon sampling theorem, the original signal must be sampled at a rate more than twice as high as the highest frequency found in the signal. If the sampling theorem is violated by an excessively low sampling rate, frequency components that originally were higher than half the sampling rate (Nyquist frequency) are interpreted as lower frequencies, since a subsampling takes place for these. This undesirable phenomenon is called the alias effect. In digital signal processing, so-called pre-filtering is therefore used to avoid alias effects. An analog low-pass filter is applied to the signal prior to digitization. As a result, the frequencies of the signal are attenuated above the Nyquist frequency. Such an electronic filter is preferably as steep as possible, which can be achieved by complex filters of higher order. Nevertheless, parts of the signal under the Nyquist frequency are inevitably attenuated, and parts above the Nyquist frequency are not completely eliminated. In practice, therefore, the exact choice of the cut-off frequency is a compromise between eliminating the alias effect and preserving the useful signal. However, complete preservation of the useful signal when using such filters is not possible.

If a radar sensor is to be validated using a target simulator, the target simulator must detect the entire bandwidth of the signal in order to correctly determine the radar cross section in the radar. To avoid associated errors, radar sensors were previously only tested with target simulators that could provide the required bandwidth. If a radar sensor transmits a signal with 2 GHz bandwidth, for example, then approximately half of the power—depending on the signal form and the filter curve of the target simulator—is lost when using a target simulator with 1 GHz bandwidth, so that from the radar's point of view the simulated target has a radar cross section about 3 dB smaller than originally set in the target simulator.

A higher bandwidth is often desired, but to a certain extent difficult to achieve. This often requires more expensive components, especially expensive processors, if they are available at all for the desired bandwidth determined by the sampling rate. Broadband components in the high-frequency range are difficult to design, making them difficult to obtain and very expensive. If the processing takes place digitally, the processor is usually decisive for the sampling rate and thus ultimately for the required bandwidth.

SUMMARY OF THE INVENTION

It is therefore an object of the present invention to provide a method for generating a simulated radar echo signal that can also be used as error-free as possible with radar target simulators with a low bandwidth.

According to the invention, a method for generating a simulated radar echo signal is provided in this respect, which includes: sending a radar signal with known bandwidth from a radar sensor to be tested to a receiving antenna of a radar target simulator, receiving the radar signal in the radar target simulator, filtering the radar signal in the radar target simulator using a low-pass filter with a known filter curve, determining the frequency spectrum of the filtered radar signal over the entire bandwidth of the low-pass filter, the bandwidth being determined by the filter curve, calculating a corrected frequency spectrum by correcting the previously determined frequency spectrum by means of the filter curve in such a way that as a corrected frequency spectrum such a frequency spectrum is obtained which corresponds to the frequency spectrum of the emitted unfiltered radar signal, calculating the power of a radar signal corresponding to the corrected frequency spectrum, calculating a scaled radar signal from the filtered radar signal, wherein the power of the scaled radar signal is equal to the power of the radar signal corresponding to the corrected frequency spectrum in that the amplitude of the filtered radar signal over its entire frequency spectrum is subjected to scalar multiplication equal for all frequencies, calculating the radar echo signal as a reflection of the scaled radar signal and/or sending the radar echo signal from a transmitting antenna of the radar target simulator to the radar sensor to be tested.

The term "radar sensor" can refer to a unit for sending and receiving radar signals with necessary antennas and other devices, as is customary for a sensor for providing driver assistance systems in motor vehicles. A filter curve of a filter is understood to be a mapping of a damping factor for a signal passing through the filter versus the frequencies of the signal, i.e., in particular an amplitude response or an intensity response (squared amplitude response). In general, a filter curve comprises a passband, characterized in that frequency portions of a signal arranged in the passband pass through the filter unattenuated, and at least one transition band adjacent to the passband, characterized in that frequency portions of a signal, which are arranged in the transition band, pass through the filter in attenuated form. The bandwidth of the low-pass filter given by the filter curve is the totality of the frequencies covered by the passband and the transition bands of the low-pass filter, i.e., all frequencies for which the filter curve of the low-pass filter indicates a damping factor greater than zero.

The calculation of the corrected frequency spectrum by correcting the previously determined frequency spectrum by means of the filter curve in such a way that a frequency spectrum is obtained that corresponds to the frequency spectrum of the emitted unfiltered radar signal is carried out by taking into account the attenuation of the filter known from the filter curve: Since from the filter curve it is known for each frequency how large the attenuation is due to the filter, in this way the unattenuated amplitude of the emitted radar signal can be inferred from the attenuated amplitude.

With the aid of the invention, the signal can therefore be manipulated in such a way that even the use of radar target simulators with a lower bandwidth than the radar sensor under test leads to a correct determination of the radar cross section in the radar sensor. By means of the invention, thus, conventional radar target simulators which are suitably upgraded by the method can also test radar sensors with higher bandwidths test with regard to the correct determination of the radar cross section. Since the filter curve of the low-pass filter of the radar target simulator is known, it can be determined on the basis of the known radar sensor bandwidth how large the lost power share is. With the help of this information, more power on the part of the radar target simulator can be emitted to compensate for the lost power share. As a result, the determination of the radar cross section in the radar sensor provides the desired result, although the signal has been limited in bandwidth. An advantage of the method according to the invention is thus that no change of the hardware in the radar target simulator is necessary. In particular, the radar target simulator can be operated without particularly powerful processors, which provide a sufficiently high sampling rate for processing very broadband signals in real time. The invention thus enables rapid further development in terms of bandwidth as well as great cost savings.

In principle, the transmitting antenna may be identical to the receiving antenna of the radar target simulator. Preferably, however, it is provided that the transmitting antenna and the receiving antenna of the radar target simulator are designed as individual devices which are separate from each other. Preferably, the transmitting antenna is moved relative to the radar sensor to be tested. This enables the simulation of radar signals reflected by fictitious objects that are not only exactly in front of the radar sensor under test, but also to the side of it.

The low-pass filter can be an anti-aliasing filter with such a cut-off frequency that does not allow sampling of the transmitted radar signal over the entire bandwidth of the radar signal. This means using traditional hardware.

According to the invention, a radar target simulator for generating a simulated radar echo signal is also provided, having: a receiving antenna for receiving a radar signal in the radar target simulator, a low-pass filter with a known filter curve for filtering the radar signal, a computing unit set up to determine the frequency spectrum of the filtered radar signal over the entire bandwidth of the low-pass filter given by the filter curve, for calculating a corrected frequency spectrum by correcting the previously determined frequency spectrum by means of the filter curve in such a way that, as a corrected frequency spectrum, such a frequency spectrum is obtained which corresponds to the frequency spectrum of the emitted unfiltered radar signal, for calculating the power of a radar signal corresponding to the corrected frequency spectrum, for calculating a scaled radar signal from the filtered radar signal, wherein the power of the scaled radar signal is equal to the power of the radar signal corresponding to the corrected frequency spectrum in that the amplitude of the filtered radar signal over its entire frequency spectrum is subjected to scalar multiplication equal for all frequencies, and for calculating the simulated radar echo signal as a reflection of the scaled radar signal, and a transmitting antenna for emitting the simulated radar echo signal.

Preferred further developments of this radar target simulator result in analogy to the previously described preferred further developments of the method according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
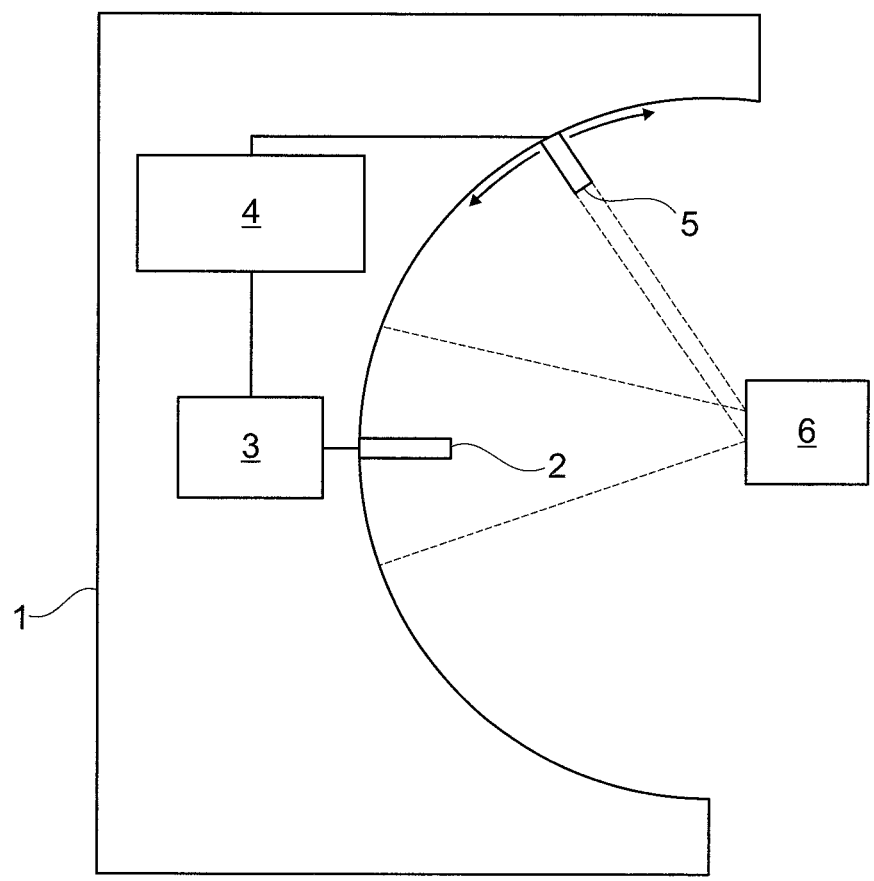
FIG. 1 shows a schematic view of a radar target simulator according to an exemplary embodiment of the invention in conjunction with a radar sensor under test.

FIG. 1 shows a schematic view of a radar target simulator 1 for generating a simulated radar echo signal with a receiving antenna 2 for receiving a radar signal in the target simulator 1, a low-pass filter 3, a computing unit 4, and a transmitting antenna 5. A radar sensor to be tested 6 is arranged relative to the radar target simulator 1 in such a way that radar signals emanating from the radar sensor 6 can be received by the receiving antenna 2 of the radar target simulator 1. As can be seen from FIG. 1, the transmitting antenna 5 and the receiving antenna 2 of the radar target simulator 1 are designed as individual devices which are separate from each other. Whereas the receiving antenna 2 of the radar target simulator 1 is fixed, the transmitting antenna 5, as indicated by two arrows, is movable, in a circle approximately 180° around the radar sensor to be tested 6. This allows for the simulation of radar signals reflected by fictitious objects that are not only located exactly in front of the radar sensor to be tested 6, but also to the side of it.

Figure 2:
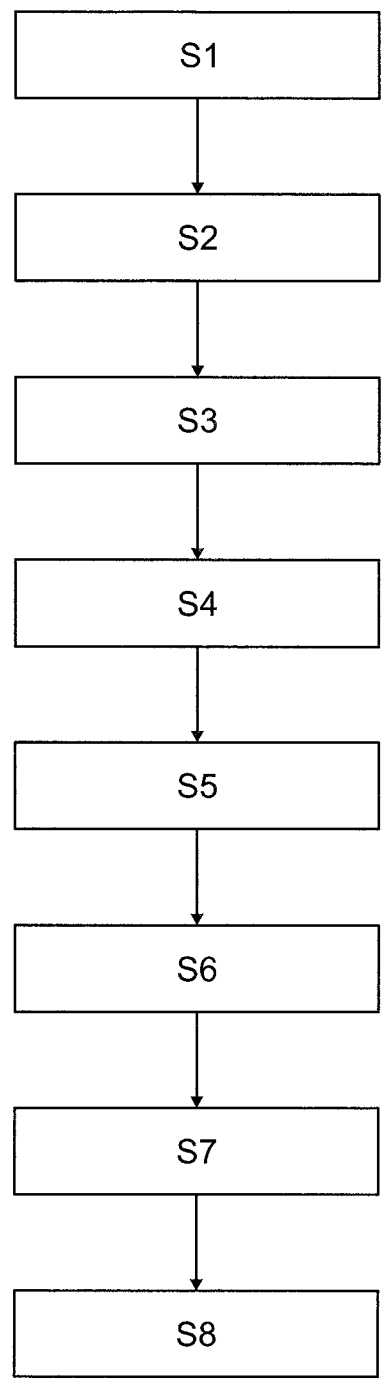
FIG. 2 shows a schematic view of the sequence of a method according to an exemplary embodiment of the invention.

The low-pass filter 3 is an anti-aliasing filter with a known filter curve, which, however, has such a cut-off frequency that does not allow the radar signal emitted by the radar sensor to be tested 6 to be sampled over its entire bandwidth. In the case of the previously described radar target simulator 1 in a conventional operation, this would in principle lead to the generation of a faulty simulated radar echo signal for the reasons already mentioned above. Therefore, according to an exemplary embodiment of the invention, the following method is for generating a simulated radar echo signal, which has the following method steps and is schematically illustrated in FIG. 2:

In a first step S1, a radar signal with known bandwidth is sent from the radar sensor to be tested 6 to the receiving antenna 2 of the radar target simulator 1. There, the radar signal is received in step S2 with the receiving antenna 2. In the following step S3, the radar signal is filtered in the radar target simulator 1 in a known manner by means of the low-pass filter 3 there in order to avoid or reduce aliasing effects. Up to this point, the presently described method substantially corresponds to the conventional methods for operating a radar target simulator.

In step S4, however, the frequency spectrum of the filtered model signal is determined over the entire bandwidth of the low-pass filter given by the filter curve. A calculation of a corrected frequency spectrum by correcting the previously determined frequency spectrum by means of the filter curve in such a way that, as a corrected frequency spectrum, such a frequency spectrum is obtained which corresponds to the frequency spectrum of the emitted unfiltered radar signal is carried out below in step S5. Then, in step S6, the power of a radar signal corresponding to the corrected frequency spectrum is calculated. Thereafter, in step S7, a scaled radar signal is calculated from the filtered radar signal, wherein the power of the scaled radar signal is equal to the power of the radar signal corresponding to the corrected frequency spectrum in that the amplitude of the filtered radar signal over its entire frequency spectrum is subjected to scalar multiplication equal for all frequencies. On the basis of this scaled radar signal, a radar echo signal is finally calculated in step S8, and the radar echo signal is emitted from the transmitting antenna 5 of the radar target simulator 1 to the radar sensor to be tested 6. The radar echo signal is calculated as a reflection of the scaled radar signal. The emitted radar echo is therefore an artificially simulated radar echo of the scaled radar signal, not the radar signal received by the receiving antenna 2.

The calculation of the corrected frequency spectrum by correcting the previously determined frequency spectrum by means of the filter curve, in such a way that a frequency spectrum is obtained which corresponds to the frequency spectrum of the emitted unfiltered radar signal, is carried out by taking into account the attenuation of the filter known from the filter curve: Since it is known from the filter curve for each frequency how large the attenuation is due to the filter, in this way the unattenuated amplitude of each frequency fraction of the emitted radar signal can be inferred from the attenuated amplitude. In this way, the signal can be manipulated in such a way that, as in the present case, the use of target simulators with a lower bandwidth than the radar sensor also leads to a correct determination of the radar cross section in the radar. Thus, with an otherwise conventional radar target simulator 1, which has been upgraded by the previously described method, radar sensors with higher bandwidth can also be tested with regard to determining the radar cross section. The only prerequisite for this is that the filter curve of the target simulator is known and that the transition range of the filter covers a sufficiently large frequency spectrum. Thus, based on the known radar sensor bandwidth, it can be determined how large the lost power share is, so that correspondingly more power can be transmitted from the target simulator 1 by means of the transmitting antenna 5 to compensate for the lost power share. Overall, the radar cross section in the radar sensor indirectly determined in this way leads to the desired (correct) result, although the signal in the radar target simulator 1 has been limited in bandwidth.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to generate a simulated radar echo signal, the method comprising:
    sending a radar signal with known bandwidth from a radar sensor to be tested to a receiving antenna of a radar target simulator;
    receiving the radar signal in the radar target simulator with the receiving antenna;
    filtering the radar signal in the radar target simulator via a low-pass filter with a known filter curve;
    determining the frequency spectrum of the filtered radar signal over a total bandwidth of the low-pass filter given by the filter curve;
    calculating a corrected frequency spectrum by correcting a previously determined frequency spectrum via the filter curve such that such a frequency spectrum is obtained as a corrected frequency spectrum that corresponds to the frequency spectrum of the emitted unfiltered radar signal;
    calculating the power of a radar signal corresponding to the corrected frequency spectrum;
    calculating a scaled radar signal from the filtered radar signal, wherein a power of the scaled radar signal equals a power of the radar signal corresponding to the corrected frequency spectrum in that the amplitude of the filtered radar signal over its entire frequency spectrum is subjected to scalar multiplication equal for all frequencies;
    calculating the radar echo signal as a reflection of the scaled radar signal; and
    sending the radar echo signal from a transmitting antenna of the radar target simulator to the radar sensor to be tested.

2. The method according to claim 1, wherein the transmitting antenna and the receiving antenna of the radar target simulator are designed as individual devices which are separate from each other.

3. The method according to claim 2, wherein the transmitting antenna is moved relative to the radar sensor to be tested.

4. The method according to claim 1, wherein the low-pass filter is an anti-aliasing filter with a cut-off frequency that does not allow sampling of the emitted radar signal over its entire bandwidth.

5. A radar target simulator to generate a simulated radar echo signal, the radar target simulator comprising:
    a receiving antenna to receive a radar signal in the radar target simulator;
    a low-pass filter with a known filter curve to filter the radar signal;
    a computing unit set up to:
        determine the frequency spectrum of the filtered radar signal over the total bandwidth of the low-pass filter given by the filter curve;

calculate a corrected frequency spectrum by correcting the previously determined frequency spectrum via the filter curve such that as a corrected frequency spectrum such a frequency spectrum is obtained which corresponds to the frequency spectrum of the emitted unfiltered radar signal;

calculate a power of a radar signal corresponding to the corrected frequency spectrum; and calculate a scaled radar signal from the filtered radar signal, a power of the scaled radar signal being equal to a power of the radar signal corresponding to the corrected frequency spectrum in that the amplitude of the filtered radar signal over its entire frequency spectrum is subjected to scalar multiplication equal for all frequencies, and calculate the simulated radar echo signal as a reflection of the scaled radar signal; and a transmitting antenna to emit the simulated radar echo signal.

6. The radar target simulator according to claim 5, wherein the transmitting antenna and the receiving antenna of the radar target simulator are designed as individual devices which are separate from each other.

7. The radar target simulator according to claim 5, wherein the transmitting antenna is movable.

8. The radar target simulator according to claim 5, wherein the low-pass filter is an anti-aliasing filter with such a cut-off frequency that does not allow sampling of the emitted radar signal over its entire bandwidth.

\* \* \* \* \*